United States Patent
Geva et al.

(10) Patent No.: US 12,113,651 B2
(45) Date of Patent: Oct. 8, 2024

(54) TRANSMITTER EQUALIZATION OPTIMIZATION FOR ETHERNET CHIP-TO-MODULE (C2M) COMPLIANCE

(71) Applicant: Cisco Technology, Inc., San Jose, CA (US)

(72) Inventors: Tomer Geva, Kiryat Ono (IL); Adee O. Ran, Maayan Baruch (IL); Liran Brecher, Kefar Sava (IL); Eran Nussbaum, Herzliya (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/813,234

(22) Filed: Jul. 18, 2022

(65) Prior Publication Data

US 2024/0022458 A1    Jan. 18, 2024

(51) Int. Cl.
*H04L 25/03* (2006.01)

(52) U.S. Cl.
CPC ............... *H04L 25/03828* (2013.01)

(58) Field of Classification Search
CPC ....... H04L 25/03828; H04L 25/03878–03885; H04L 25/0264; H04L 25/028; H04L 25/0286; H04L 25/0288; H04L 25/03343
See application file for complete search history.

(56) References Cited

U.S. PATENT DOCUMENTS

| | | | | |
|---|---|---|---|---|
| 6,266,379 B1 * | 7/2001 | Dally | .................. | H04L 27/01 375/296 |
| 6,775,334 B1 * | 8/2004 | Liu | ..................... | H04L 27/02 375/341 |
| 7,000,031 B2 * | 2/2006 | Fischer | ................ | H04M 11/00 709/248 |
| 7,277,477 B1 * | 10/2007 | Ahmad | ............ | H04L 25/03343 375/220 |
| 7,643,752 B2 * | 1/2010 | Swenson | ............ | H04B 10/0731 398/9 |
| 7,656,941 B2 * | 2/2010 | Morgan | ................... | H04L 7/04 375/232 |
| 7,983,323 B2 * | 7/2011 | Kent | .................... | H04B 1/7115 375/349 |

(Continued)

FOREIGN PATENT DOCUMENTS

| | | |
|---|---|---|
| EP | 1829252 A2 | 9/2007 |
| WO | 2019164760 A1 | 8/2019 |

OTHER PUBLICATIONS

Jesse Brannon et al., "Equalization of Backplane Channels using Transmitter FFE and Receiver CTLE+DFE," Electrical Engineering and Computer Sciences University of California at Berkeley, dated Jul. 18, 2018, pp. 1-51.

(Continued)

*Primary Examiner* — James M Perez
(74) *Attorney, Agent, or Firm* — Patterson + Sheridan, LLP

(57) ABSTRACT

Techniques and apparatus for optimizing transmitter equalization are described. An example technique includes capturing a single output signal transmitted from a port on at least one channel of a host device. An impulse response of the channel is determined based at least in part on the single output signal. A transmitter feedforward equalization (FFE) is generated, based at least in part on the impulse response of the channel. The transmitter FFE is applied to the channel of the port of the host device.

20 Claims, 9 Drawing Sheets

(56) References Cited

U.S. PATENT DOCUMENTS

| | | | | |
|---|---|---|---|---|
| 8,009,981 B2* | 8/2011 | Swenson | H04B 10/0731 | 398/16 |
| 8,064,556 B2* | 11/2011 | Subrahmanya | H04B 1/71057 | 375/349 |
| 8,073,046 B2* | 12/2011 | Cohen | H04L 25/03343 | 375/232 |
| 8,098,776 B2* | 1/2012 | Kent | H04L 25/0214 | 375/232 |
| 8,335,286 B2* | 12/2012 | Mergen | H04L 1/1845 | 375/349 |
| 8,379,710 B2* | 2/2013 | Mezer | H04L 25/03343 | 375/232 |
| 8,611,403 B1* | 12/2013 | Ding | G06F 1/3206 | 375/219 |
| 8,644,371 B2* | 2/2014 | Mezer | H04L 25/03343 | 375/232 |
| 8,705,606 B2* | 4/2014 | Farjad-Rad | H04L 25/03885 | 375/232 |
| 8,737,490 B1* | 5/2014 | Wilson | H04L 25/03057 | 375/244 |
| 8,848,774 B2* | 9/2014 | Zhong | H04L 25/03343 | 375/232 |
| 8,902,964 B2* | 12/2014 | Aguilar-Arreola | H04L 25/14 | 375/232 |
| 8,989,249 B2* | 3/2015 | Zerbe | H04W 52/20 | 375/259 |
| 9,071,286 B2* | 6/2015 | Hadani | H04L 5/0044 | |
| 9,210,008 B2* | 12/2015 | Rane | H04L 25/03878 | |
| 9,237,044 B1* | 1/2016 | Wu | H04L 25/03343 | |
| 9,264,276 B1* | 2/2016 | Chan | H04L 27/2647 | |
| 9,294,315 B2* | 3/2016 | Hadani | H04L 27/2655 | |
| 9,306,789 B2* | 4/2016 | Dhayni | H04L 27/2672 | |
| 9,337,993 B1* | 5/2016 | Lugthart | H04L 7/0037 | |
| 9,378,843 B1* | 6/2016 | Hossain | H04B 1/1027 | |
| 9,379,920 B1* | 6/2016 | Liao | H04L 25/03 | |
| 9,419,746 B1* | 8/2016 | Baeckler | H04L 1/0001 | |
| 9,438,450 B1* | 9/2016 | Kang | H04L 25/03885 | |
| 9,473,332 B2* | 10/2016 | Bajcsy | H04L 27/2654 | |
| 9,548,840 B2* | 1/2017 | Hadani | H04L 27/2639 | |
| 9,645,965 B2* | 5/2017 | Das Sharma | H04L 25/03019 | |
| 9,787,505 B2* | 10/2017 | Lim | H04L 25/03057 | |
| 9,887,737 B2* | 2/2018 | Jin | H04L 41/0631 | |
| 9,923,738 B1* | 3/2018 | Wallichs | H04L 25/03343 | |
| 9,929,803 B1* | 3/2018 | Wu | H04L 69/18 | |
| 10,063,354 B2* | 8/2018 | Hadani | H04L 27/2639 | |
| 10,069,660 B1* | 9/2018 | Sun | H04L 25/03146 | |
| 10,255,448 B1* | 4/2019 | Berge | G06F 21/606 | |
| 10,312,968 B2* | 6/2019 | Jin | H04B 3/46 | |
| 10,348,554 B2* | 7/2019 | Jin | H04L 41/5009 | |
| 10,547,475 B1* | 1/2020 | Gagnon | H04L 25/03057 | |
| 10,567,125 B2* | 2/2020 | Hadani | H04L 27/10 | |
| 11,032,111 B2* | 6/2021 | Sun | H04B 1/40 | |
| 11,038,636 B2* | 6/2021 | Hadani | H04L 27/26532 | |
| 11,177,986 B1* | 11/2021 | Ganesan | H04L 25/03878 | |
| 11,223,468 B1* | 1/2022 | Ryu | H04L 7/0087 | |
| 11,309,995 B2* | 4/2022 | Sun | H04L 25/03878 | |
| 11,665,041 B2* | 5/2023 | Hadani | H04L 27/01 | 375/346 |
| 11,943,089 B2* | 3/2024 | Hadani | H04L 27/10 | |
| 2002/0061012 A1* | 5/2002 | Thi | H04L 12/66 | 370/352 |
| 2002/0080898 A1* | 6/2002 | Agazzi | H04L 25/03159 | 375/355 |
| 2002/0141347 A1* | 10/2002 | Harp | H04N 5/21 | 725/124 |
| 2003/0177502 A1* | 9/2003 | Kolze | H04N 21/6118 | 725/111 |
| 2003/0185310 A1* | 10/2003 | Ketchum | H04B 7/0413 | 375/259 |
| 2005/0078758 A1* | 4/2005 | Aziz | G01R 31/31715 | 375/257 |
| 2006/0263084 A1* | 11/2006 | Swenson | H04B 10/0731 | 398/23 |
| 2007/0249296 A1* | 10/2007 | Howard | H04L 25/0248 | 455/562.1 |
| 2008/0101794 A9* | 5/2008 | Swenson | H04B 10/0731 | 398/23 |
| 2008/0310493 A1* | 12/2008 | Cohen | H04L 25/03114 | 375/232 |
| 2010/0020860 A1* | 1/2010 | Dai | H04L 25/03057 | 375/232 |
| 2010/0103839 A1* | 4/2010 | Swenson | H04B 10/0731 | 455/115.2 |
| 2010/0150264 A1* | 6/2010 | Taubin | H04L 25/4975 | 375/296 |
| 2010/0232492 A1* | 9/2010 | Mezer | H04L 25/03343 | 375/232 |
| 2011/0103459 A1* | 5/2011 | Esmailian | H04L 25/03057 | 375/233 |
| 2012/0257652 A1* | 10/2012 | Malipatil | H04L 25/03057 | 375/233 |
| 2013/0022090 A1* | 1/2013 | Weng | H04L 27/2607 | 375/260 |
| 2013/0044028 A1* | 2/2013 | Lea | H04B 7/10 | 342/359 |
| 2013/0073749 A1* | 3/2013 | Tremblay | H04L 12/40032 | 710/16 |
| 2013/0114663 A1* | 5/2013 | Ding | H04L 25/03038 | 375/230 |
| 2013/0136161 A1* | 5/2013 | Mezer | H04L 27/01 | 375/219 |
| 2013/0148712 A1* | 6/2013 | Malipatil | H04L 7/033 | 375/233 |
| 2013/0202064 A1* | 8/2013 | Chmelar | H04L 25/03057 | 375/340 |
| 2013/0202065 A1* | 8/2013 | Chmelar | H04L 25/03057 | 375/340 |
| 2013/0223571 A1* | 8/2013 | Dark | H04B 1/0028 | 375/296 |
| 2013/0230093 A1* | 9/2013 | Aziz | H04L 25/03885 | 375/233 |
| 2013/0287088 A1* | 10/2013 | Mobin | H04L 7/10 | 375/232 |
| 2014/0064352 A1* | 3/2014 | Zhong | H04L 25/03076 | 375/232 |
| 2014/0092952 A1* | 4/2014 | Aguilar-Arreola | H04L 25/03878 | 375/233 |
| 2014/0169406 A1* | 6/2014 | Hadani | H04L 25/03828 | 375/131 |
| 2014/0169437 A1* | 6/2014 | Hadani | H04L 27/26532 | 375/232 |
| 2014/0181845 A1* | 6/2014 | Jing | H04L 25/03878 | 719/321 |
| 2014/0281068 A1* | 9/2014 | Das Sharma | H04L 25/03885 | 710/104 |
| 2015/0043628 A1* | 2/2015 | Rane | H04L 25/03878 | 375/232 |
| 2015/0249558 A1* | 9/2015 | Aguilar-Arreola | H04L 25/03878 | 375/233 |
| 2016/0191217 A1* | 6/2016 | Hadani | H04L 27/26532 | 375/260 |
| 2017/0126442 A1* | 5/2017 | Hong | H04L 1/0084 | |
| 2017/0201354 A1* | 7/2017 | Hadani | H04L 27/26532 | |
| 2017/0310361 A1* | 10/2017 | Jin | H04L 43/16 | |
| 2017/0310539 A1* | 10/2017 | Jin | H04L 41/5009 | |
| 2017/0310541 A1* | 10/2017 | Jin | H04L 67/1097 | |
| 2018/0045761 A1* | 2/2018 | Tan | G01R 13/029 | |
| 2018/0191530 A1* | 7/2018 | Wallichs | H04L 25/03057 | |
| 2018/0248650 A1* | 8/2018 | Das Sharma | H04L 1/0009 | |
| 2018/0254927 A1* | 9/2018 | Yagil | H04B 3/23 | |
| 2019/0215109 A1* | 7/2019 | Hadani | H04B 7/005 | |
| 2020/0076651 A1* | 3/2020 | Sun | H04L 25/03885 | |
| 2020/0259604 A1* | 8/2020 | Hadani | H04B 7/005 | |
| 2021/0013998 A1* | 1/2021 | Sun | H04L 25/0272 | |
| 2021/0314111 A1* | 10/2021 | Hadani | H04B 7/005 | |

(56) References Cited

U.S. PATENT DOCUMENTS

2023/0412444 A1* 12/2023 Hadani ............... H04L 27/2697
2024/0022458 A1* 1/2024 Geva ................. H04L 25/03343

OTHER PUBLICATIONS

Ryan Boesch, "Signal Preconditioning using Feedforward Equalizers in ADC-Based Data Links," Department of electrical engineering and the committee on graduate studies of Standford University, dated May 2016, pp. 1-158.

Beyene W.T., et al., "Advanced Modeling and Accurate Characterization of a 16 GB/s Memory Interface", IEEE Transactions on Advanced Packaging, IEEE Service Center, Piscataway, NJ, USA, vol. 32, No. 2, May 1, 2009, pp. 306-327, XP011346258, ISSN: 1521-3323, DOI: 10.1109/TADVP.2009.2018460, Section IV.A, Section IV.B, Section IV.C.

International Search Report and Written Opinion for International Application No. PCT/US2023/070116, mailed Oct. 12, 2023, 16 Pages.

\* cited by examiner

500 — Reference Receiver Parameters

| Parameter | Symbol | Value | Units |
|---|---|---|---|
| Signaling rate | $f_b$ | 53.125 | GBd |
| Receiver 3 dB bandwidth | $f_r$ | $0.75 \times f_b$ | GHz |
| Continuous time filter, DC gain for TP1a<br>Range for $g_{DC2} = 0$<br>Range for $-1 \le g_{DC2} < 0$<br>Range for $-2 \le g_{DC2} < -1$<br>Range for $-3 \le g_{DC2} < -2$<br>Step size | $g_{DC}$ | -2 to -9<br>-2 to -11<br>-4 to -10<br>-4 to -9<br>1.0 | dB |
| Continuous time filter, DC gain 2 for TP1a<br>Range<br>Step size | $g_{DC2}$ | -3 to 0<br>0.5 | dB |
| Continuous time filter, DC gain for TP4 near-end<br>Range<br>Step size | $g_{DC}$ | -5 to -1<br>1.0 | dB |
| Continuous time filter, DC gain 2 for TP4 near-end<br>Range<br>Step size | $g_{DC2}$ | -2 to 0<br>0.5 | dB |
| Continuous time filter, DC gain for TP4 far-end<br>Range<br>Step size | $g_{DC}$ | -9 to -2<br>1.0 | dB |
| Continuous time filter, DC gain 2 for TP4 far-end<br>Range<br>Step size | $g_{DC2}$ | -3 to -1<br>0.5 | dB |
| Continuous time filter, zero frequency for $g_{DC} = 0$ | $f_z$ | 12.58 | GHz |
| Continuous time filter, pole frequencies | $f_{p1}$<br>$f_{p2}$ | 20<br>28 | GHz<br>GHz |
| Continuous time filter, low-frequency pole/zero | $f_{LF}$ | $f_b/40$ | GHz |
| Decision feedback equalizer (DFE) length | $N_b$ | 4 | UI |
| Normalized DFE coefficient maximum limit<br>$n = 1$<br>$n = 2$<br>$n = 3$ or $4$ | $bb_{max}(n)$ | 0.4<br>0.15<br>0.1 | -<br>-<br>- |
| Normalized DFE coefficient minimum limit<br>$n = 1$<br>$n = 2$<br>$n = 3$ or $4$ | $bb_{min}(n)$ | 0.1<br>-0.15<br>-0.05 | -<br>-<br>- |
| One-sided noise spectral density | $\eta_0$ | $4.1 \times 10^{-8}$ | $V^2/GHz$ |

FIG. 5

TRANSMITTER EQUALIZATION OPTIMIZATION FOR ETHERNET CHIP-TO-MODULE (C2M) COMPLIANCE

TECHNICAL FIELD

Embodiments presented in this disclosure generally relate to electronic communications. More specifically, embodiments disclosed herein relate to improved techniques for transmitter equalization optimization.

BACKGROUND

In high speed communications (e.g., chip-to-module communication, chip-to-chip communication, etc.), equalization may be used to adjust for dispersion and reflections in the electrical channel and to create a sufficiently high signal-to-noise (SNR) (e.g., an "eye-opening") to operate at the expected bit error ratio (BER). A common equalization scheme involves using a digital feed-forward equalizer (also referred to as feed-forward equalization) (FFE). Implementing FFE in the receiver is the typical approach because the signal at the receiver has passed through the channel and thus, the receiver can detect the effects of the channel on the signal and optimize the FFE accordingly. For example, equalization at the receiver generally aims for signal correction by way of amplification, digital correction, or both amplification and digital correction. In some examples, equalization may be performed at the transmitter to mitigate certain channel effects, such as intersymbol interference (ISI), which can lead to high BER. However, there may be certain challenges with performing equalization at the transmitter.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 5 illustrates a table with example reference receiver parameters.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
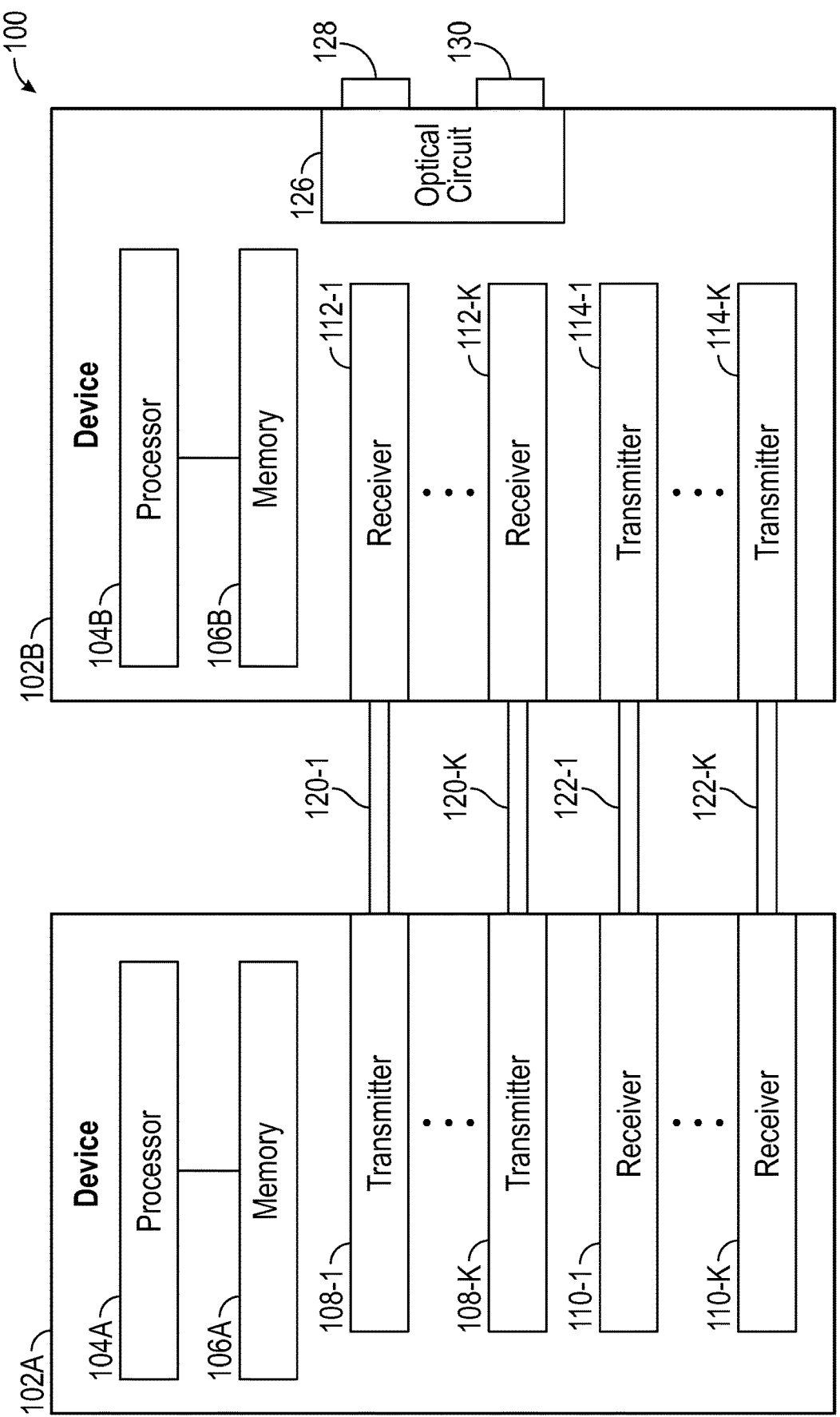
FIG. 1 illustrates an example system, according to one embodiment.

One embodiment presented in this disclosure is a computer-implemented method for performing transmitter equalization for a host device including one or more ports. Each port includes at least one channel. The computer-implemented method includes capturing a single output signal transmitted from the port on the at least one channel. The computer-implemented method also includes determining an impulse response of the channel, based at least in part on the single output signal. The computer-implemented method further includes generating a transmitter feedforward equalization (FFE), based at least in part on the impulse response of the channel. The computer-implemented method further yet includes applying the transmitter FFE to the channel of the port of the host device.

Another embodiment presented in this disclosure is a non-transitory computer-readable medium. The non-transitory computer-readable medium includes computer program code that, when executed by one or more processors, performs an operation for optimizing transmitter equalization for a host device comprising one or more ports, each port comprising at least one channel. The operation includes capturing a single output signal transmitted from the port on the at least one channel. The operation also includes determining an impulse response of the channel, based at least in part on the single output signal. The operation further includes generating a transmitter feedforward equalization (FFE), based at least in part on the impulse response of the channel. The operation further yet includes applying the transmitter FFE to the channel of the port of the host device.

Another embodiment presented in this disclosure is a computing system. The computing system includes one or more processors and a memory containing a program that, when executed by the processor, performs an operation for optimizing transmitter equalization. The operation includes capturing a single output signal transmitted from a port on at least one channel of a host device. The operation also includes determining an impulse response of the channel, based at least in part on the single output signal. The operation further includes generating a transmitter feedforward equalization (FFE), based at least in part on the impulse response of the channel. The operation further yet includes applying the transmitter FFE to the channel of the port of the host device.

Example Embodiments

Today, high speed communications, such as chip-to-module (C2M) communications, are using increasingly higher signaling rates. For example, the Institute of Electrical and Electronics Engineers (IEEE) 802.3ck may support up to 53.125 gigabaud (GBd) for C2M communications. One challenge with supporting higher signaling rates is that it can be significantly challenging to perform transmit(ter) (Tx) equalization (e.g., equalization on the transmit (chip) side of the C2M electrical interface). For example, one of the emerging problems involves the configuration of Tx equalizers to negate the temporal effects and distortion of each channel in a system that may include a large set of different channels, such as a high-radix switch. At lower signaling rates (e.g., 50 Gbd and below), the set of channels within such a system could be considered similar enough, such that a small number of preset Tx equalizers would be sufficient for most channels. However, with Nyquist frequencies in the gigahertz (GHz) range (e.g., >26 GHz), the breadth of printed circuit board (PCB) and package routing distances can create channel variations that have to use a tailored Tx equalizer for every lane.

Conventional techniques for optimizing the Tx equalizer for a given lane involve performing an exhaustive (brute-force) search over all possible sets of equalizer coefficient values, and for each possible equalizer setting, measuring the resulting output signal and checking whether the resulting output signal meets the target specification. However, as the length of the equalizer increases, the number of measurements and the amount of time it takes to complete this process can grow exponentially. For example, the process of validating the result of applying a certain equalizer with the respect to the standard specifications generally involves scanning all the reference receivers defined in the IEEE standard and calculating various parameters (e.g., eye height (EH), vertical eye closure (VEC)) for each reference receiver. Given that it can take about a minute to perform each measurement and that there may be hundreds of possible equalizer configurations and multiple channels to optimize, using conventional techniques to perform Tx equalization becomes infeasible.

To address this, embodiments described herein provide techniques for optimizing a Tx equalizer (e.g., according to standard specifications) for a given channel of an Ethernet C2M. Embodiments may be applicable for performing per-port optimization at the transmitting device in applications such as high-radix switches. As described below, embodiments can determine an optimal Tx equalizer configuration (e.g., an equalizer configuration satisfying a predefined target or condition) using a single measurement. For example, given a recording of the transmitter output on a measurement device (e.g., scope), embodiments can output the suggested Tx equalizer to use in order to comply with a communication standard (e.g., IEEE 802.3), as well as the reference receiver of choice to use for the testing. In this manner, embodiments can render the action of scanning both the reference receivers and the Tx equalizers obsolete and shorten testing times from approximately several hours to approximately one minute per lane.

FIG. 1 illustrates an example system 100. As shown in FIG. 1, the system 100 includes a device 102A and a device 102B. The devices 102A and 102B communicate signals to one another. In particular embodiments, the device 102A (which may be referred to as a "local device," a "transmitting device," "a transmit device," or a "host") is a communication switch, router, retime, repeater, or endpoint, and the device 102B (which may be referred to as a "remote device," a "receiving device," "a receive device," or a "module") is an optical transceiver. In some cases, the switch and the optical transceiver may be implemented as co-packaged optics (CPO) or near-packaged optics (NPO) (e.g., the switch and the optical transceiver may be packaged on the same substrate). In some cases, the switch and the optical transceiver may be implemented as a Ethernet C2M, where the switch (e.g., where the chip is located) includes one or more Ethernet ports for plugging in one or more optical transceivers (e.g., modules).

Generally, the device 102A transmits electric signals to the device 102B over a transmit channel that introduces distortions into the transmitted signal. The transmitted signal includes signal points at voltage levels representing digital values (e.g., logical high and logical low values). The distortions introduced by the channel affect these voltage levels as the signal travels through the channel. The device 102B receives the signal along with the distortions and attempts to recreate the originally transmitted signal as a response signal.

As shown, the devices 102A and 102B include processors 104A and 104B, respectively, and memories 106A and 106B, respectively. The processors 104A and 104B and memories 106A and 106B may perform the functions or actions of the devices 102A and 102B. In some embodiments, only one of the devices 102A or 102B includes a processor 104 and a memory 106. In some embodiments, the processor 104 and the memory 106 are external to the devices 102A and 102B and control the operations of both devices 102A and 102B.

The processor 104 is any electronic circuitry, including, but not limited to one or a combination of microprocessors, microcontrollers, application specific integrated circuits (ASIC), application specific instruction set processor (ASIP), and/or state machines, that communicatively couples to memory 106 and controls the operation of the device 102. The processor 104 may be 8-bit, 16-bit, 32-bit, 64-bit or of any other suitable architecture. The processor 104 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 104 may include other hardware that operates software to control and process information. The processor 104 executes software stored on the memory 106 to perform any of the functions described herein. The processor 104 controls the operation and administration of the device 102 by processing information (e.g., information received from the devices 102 and memory 106). The processor 104 is not limited to a single processing device and may encompass multiple processing devices.

The memory 106 may store, either permanently or temporarily, data, operational software, or other information for the processor 104. The memory 106 may include any one or a combination of volatile or non-volatile local or remote devices suitable for storing information. For example, the memory 106 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 106, a disk, a CD, or a flash drive. In particular embodiments, the software may include an application executable by the processor 104 to perform one or more of the functions described herein.

In the embodiment shown in FIG. 1, the device 102A includes one or more transmitters 108 1-K and one or more receivers 110 1-K. The transmitters 108 1-K transmit signals to the device 102B over channels 120 1-K. Additionally, the receivers 110 1-K receive signals from the device 102B over channels 122 1-K. The device 102B includes one or more receivers 112 1-K and one or more transmitters 114 1-K. The receivers 112 1-K receive signals from the device 102A over the channels 120 1-K. The transmitters 114 1-K transmit signals to the device 102A over the channels 122 1-K.

The device 102B includes an optical circuit 126 that sends or receives optical signals. The optical circuit 126 may include an optical transmitter 128 and an optical receiver 130. The device 102B may convert electrical signals received from the device 102A into optical signals for communication by the optical circuit 126. Additionally, the device 102B may convert optical signals received by the optical circuit 126 into electrical signals to be communicated to the device 102A.

As noted, the device 102A may be referred to as a host in an Ethernet C2M interface. For example, the device 102 may be a switch (or switch box) on the network that includes one or more Ethernet ports (e.g., physical connectors), to which optical modules are plugged. Each Ethernet port may have one or more channels of communication. Each channel may be referred to as a "lane," and is composed of a transmitter (Tx) (e.g., transmitter 108), an electrical interconnect (e.g., copper traces on a PCB and/or thin twinaxial cables) (e.g., channel 120), and a receiver (Rx) (e.g., receiver 112).

One or more of the channels 120 of a given Ethernet port may distort the signals communicated through those channels. For example, dispersions or reflections that occur in the channels may distort the signals communicated through the channels 120. Consequently, the system 100 pay perform equalization at the device 102A for one or more of the transmitters 108, prior to transmitting a signal over channels 120.

However, due to the differences in routing between the host chip and the connector across different lanes, various parameters, such as EH and VEC are challenging to meet with significantly large signaling rates (e.g., 53.125 GBd signaling). For example, these parameters are highly dependent on Tx equalization on the host, which has to be calibrated per lane for optimal performance.

For example, conventional techniques for performing Tx equalization are generally infeasible for computing the optimal Tx configuration in a system that includes a large number of channels. As noted above, such conventional techniques for optimizing the Tx equalizer for a given lane involves performing an exhaustive (brute-force) search over all possible sets of equalizer coefficient values, and for each possible equalizer setting, measuring the resulting output signal and checking whether the resulting output signal meets the target specification (e.g., a target EH, a target VEC, etc.). However, as the length of the equalizer increases, the number of measurements and the amount of time it takes to complete this process can grow exponentially, making conventional techniques for performing Tx equalization impractical.

Figure 2:
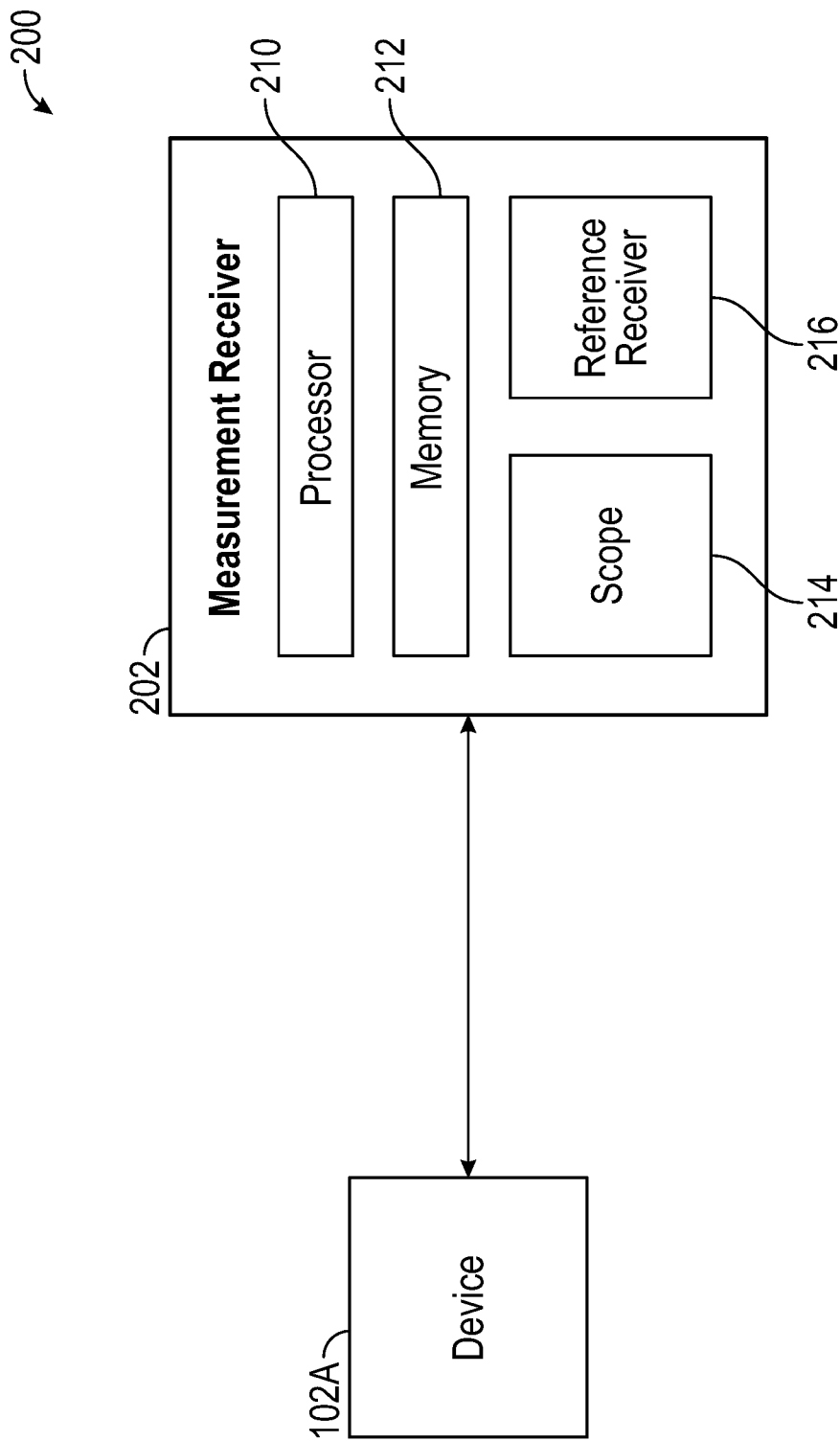
FIG. 2 illustrates an example system for optimizing transmitter equalization, according to one embodiment.

FIG. 2 illustrates a system 200 for optimizing Tx equalization, according to one embodiment. The system 200 includes a measurement receiver 202 and a device 102A, which are interconnected together. In this embodiment, the device 102A is the device-under-test (DUT). As noted, in embodiments herein, the DUT is a transmitting device (or host), which includes one or more Ethernet ports, each Ethernet port having one or more channels of communication.

The measurement receiver 202 includes a processor 210, a memory 212, a scope 214, and a reference receiver 216. The measurement receiver 202 is generally configured to test the Tx compliance of each lane in the DUT (e.g., host, such as device 102A). The scope 214 is connected to the output of the host and is configured to apply a reference receiver algorithm corresponding to a particular reference receiver 216.

The processor 210 and memory 212 may perform the functions or actions of the measurement receiver 202. In some embodiments, the processor 210 and the memory 212 are external to the measurement receiver 202 and controls the operations of the measurement receiver 202.

The processor 210 is any electronic circuitry, including, but not limited to one or a combination of microprocessors, microcontrollers, ASIC, ASIP, and/or state machines, that communicatively couples to memory 212 and controls the operation of the measurement receiver 202. The processor 104 may be 8-bit, 16-bit, 32-bit, 64-bit or of any other suitable architecture. The processor 210 may include an ALU for performing arithmetic and logic operations, processor registers that supply operands to the ALU and store the results of ALU operations, and a control unit that fetches instructions from memory and executes them by directing the coordinated operations of the ALU, registers and other components. The processor 210 may include other hardware that operates software to control and process information. The processor 210 executes software stored on the memory 212 to perform any of the functions described herein. The processor 210 controls the operation and administration of the measurement receiver 202 by processing information (e.g., information received from device 102A). The processor 210 is not limited to a single processing device and may encompass multiple processing devices.

The memory 212 may store, either permanently or temporarily, data, operational software, or other information for the processor 210. The memory 212 may include any one or a combination of volatile or non-volatile local or remote devices suitable for storing information. For example, the memory 212 may include RAM, ROM, magnetic storage devices, optical storage devices, or any other suitable information storage device or a combination of these devices. The software represents any suitable set of instructions, logic, or code embodied in a computer-readable storage medium. For example, the software may be embodied in the memory 212, a disk, a CD, or a flash drive. In particular embodiments, the software may include an application executable by the processor 210 to perform one or more of the functions described herein.

In one embodiment described herein, the measurement receiver 202 can determine an adequate Tx equalizer configuration for each lane of one or more Ethernet ports of a host (e.g., DUT, such as device 102A), using a single measurement. For example, the measurement receiver 202, via processor 210 and memory 212 may be configured to implement a software tool that outputs the Tx equalizer to use in order to comply with standard specifications. In one particular embodiment, given a single recording of the Tx output on the scope 214 (e.g., a single measurement), the measurement receiver 202 can determine the suggested Tx equalizer to use as well as the reference receiver 216 to use for the testing. In this manner, embodiments can render the action of scanning both the reference receivers and the Tx equalizers obsolete and shorten testing times from several hours to about one minute per lane. For example, as noted above, with conventional techniques, the process of validating the result of applying a certain equalizer with respect to standard specifications generally involves scanning all the reference receivers defined in the IEEE standard and calculating the EH and VECT for each reference receiver.

Figure 3:
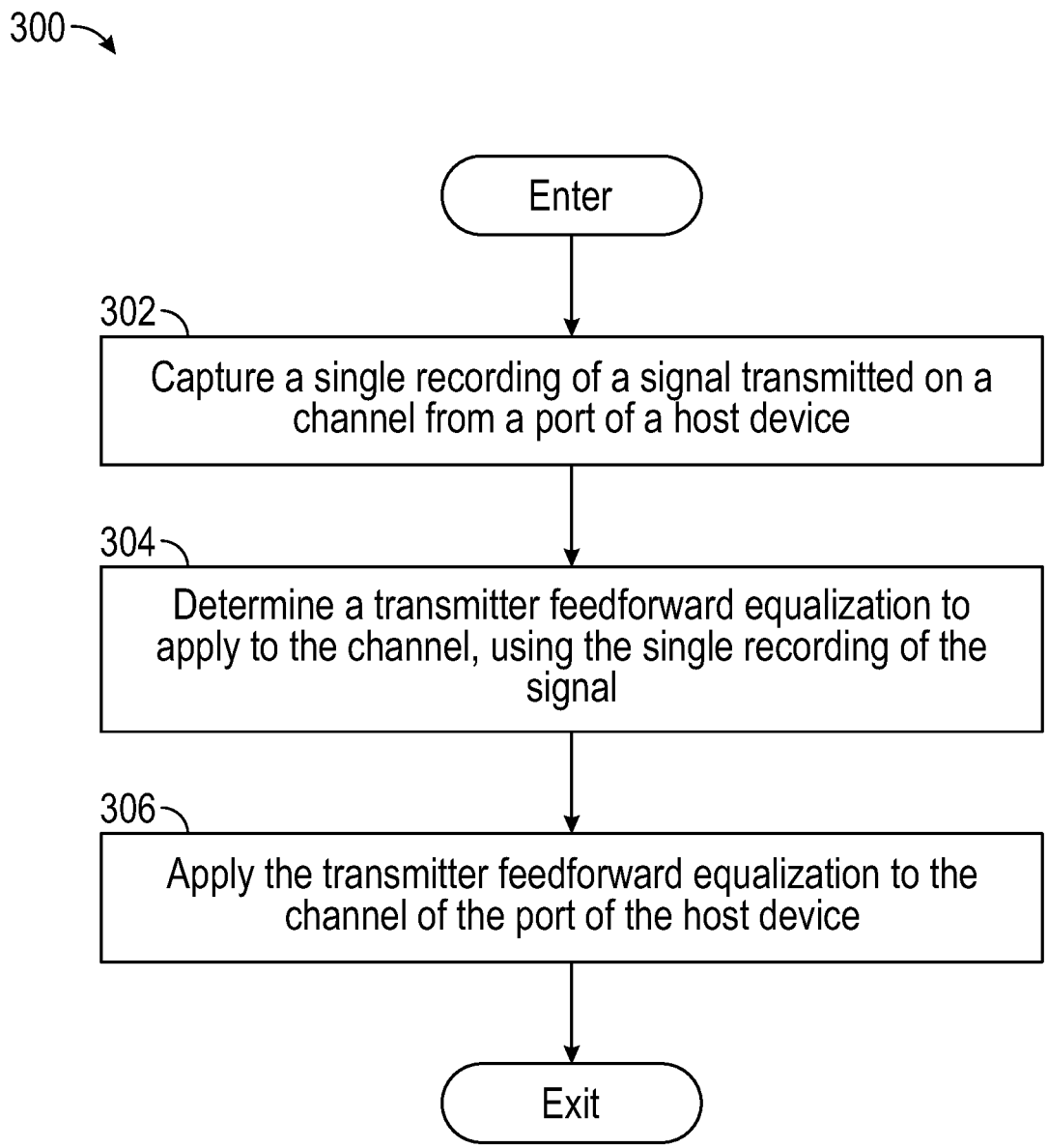
FIG. 3 is a flowchart of a method for performing transmitter equalization, according to one embodiment.

FIG. 3 is a flowchart of a method 300 for performing Tx equalization, according to one embodiment. The method 300 may be performed by a computing system (e.g., measurement receiver 202). In one embodiment, the method 300 may be performed for each channel associated with a given port on a host device (e.g., device 102A).

Method 300 may enter at block 302, where the computing system captures a single recording of a signal transmitted on a channel (e.g., channel 120) from a port (e.g., Ethernet port) of a host device (e.g., device 102A). In one embodiment, the signal is based on a spectrally-rich pattern, such as PRBS13Q. Note, however, that this is merely an example and that other spectrally-rich patterns consistent with the functionality described herein may be used. The computing system may synchronize to the pattern with sufficient oversampling (e.g., 16 samples per unit interval).

In one embodiment, the host device may be configured to transmit the signal without any equalization. In another embodiment, the host device may be configured to transmit the signal with equalization. The computing system may save the recording of the signal in a storage system, which may be located within the computing system or elsewhere (e.g., a computing system(s) in a cloud computing environment). In some cases, the recording may be saved in any suitable file format, including, for example, .csv files.

At block 304, the computing system determines a Tx feedforward equalization (FFE) (Tx FFE) to apply to the channel, using the single recording of the signal. For example, the computing system may determine the Tx FFE without additional measurements or changes to the DUT. In one embodiment, the Tx FFE may include a set of Tx FFE coefficients. In one embodiment, the computing system, at block 304, may also determine a target (or suggested) reference receiver configuration among a set of possible reference receiver configurations specified in the IEEE standard. In one embodiment, the Tx FFE determined at block 304 may be an optimal Tx FFE (e.g., a Tx FFE that satisfies a set of target parameters specified in a standard), among the set of possible reference receiver configurations in the standard. The set of target parameters may include, but are not limited to, EH, VEC, etc. FIG. 5 illustrates a table 500 with example reference receiver parameters in an IEEE standard (e.g., IEEE 802.3ck).

At block 306, the computing system applies the Tx FFE to the channel of the port of the host device. In one embodiment, once the Tx FFE is applied to the host device, the computing system may measure an output signal (with the applied Tx FFE) from the host device. In such an embodiment, the computing system may check for compliance with a standard (e.g., IEEE standard) by applying the reference receiver associated with the Tx FFE. After applying the reference receiver, the computing system may verify that a set of compliance metrics satisfy a predetermined condition (e.g., minimum mean squared error (MMSE)).

Figure 4:
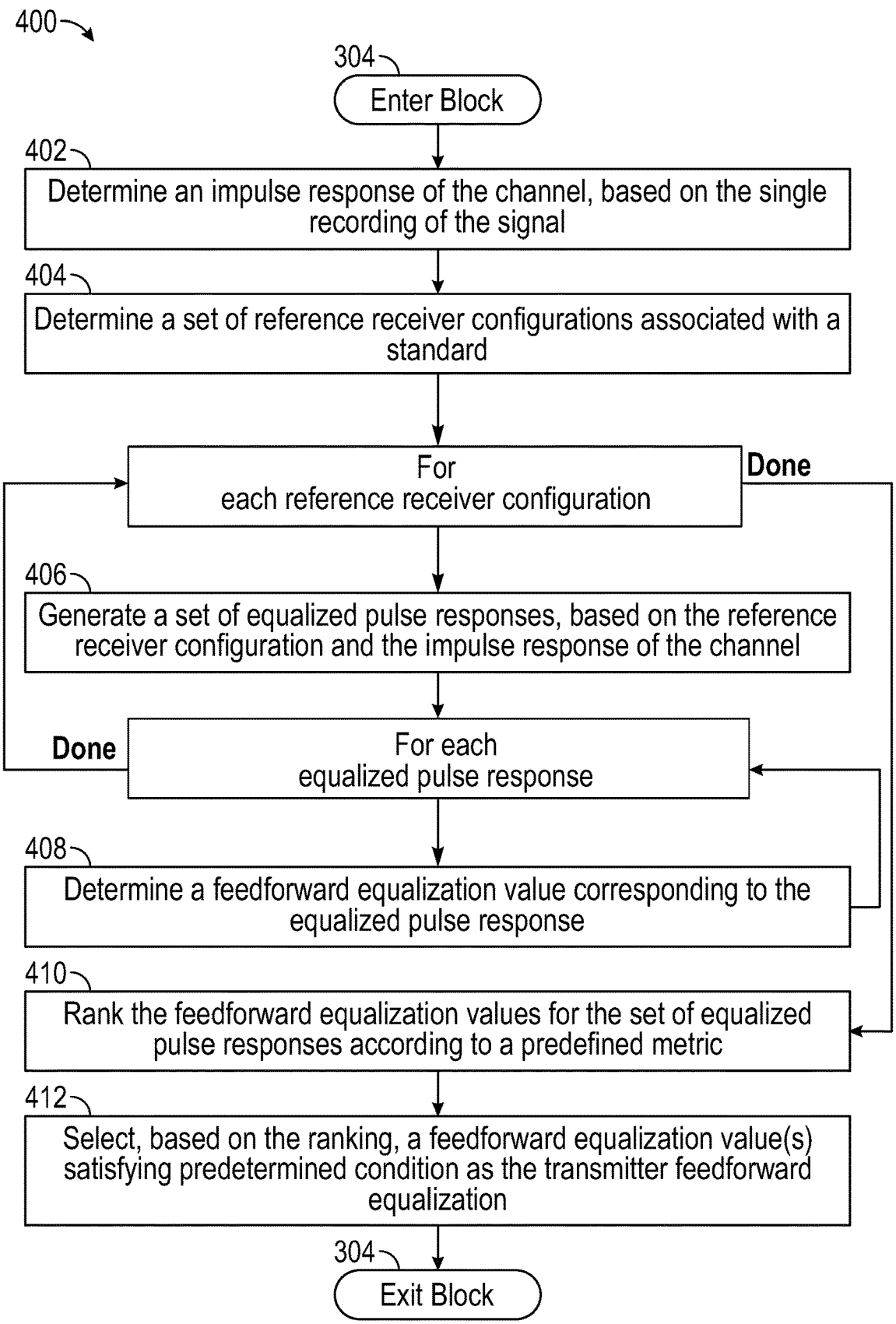
FIG. 4 is a flowchart of another method for performing transmitter equalization, according to one embodiment.

FIG. 4 is a flowchart of a method 400 for performing Tx equalization, according to one embodiment. The method 400 may be performed by a computing system (e.g., measurement receiver 202). In one embodiment, the method 400 may be used to implement the operations of block 304 of the method 300 illustrated in FIG. 3.

Method 400 may enter at block 402, where the computing system determines an impulse response of the channel, based on the single recording of the signal. In one embodiment, the impulse response of the channel may be determined by using a least-squares estimation technique to extract the impulse response of the channel. An example of such a least-squares estimation is described in subclause 162.9.3.1.1 of IEEE 802.3ck. Subclause 162.9.3.1.1 of IEEE 802.3ck is incorporated by reference herein.

At block 404, the computing system determines a set of reference receiver configurations associated with a standard (e.g., IEEE 802.3ck). In one embodiment, each reference receiver configuration includes a reference continuous time linear equalization (CTLE) setting (or set of values). For example, a reference CTLE setting may include pair of CTLE values ($g_{dc}$, $g_{dc2}$) from a range of CTLE values specified in the standard, as shown in table 500 of FIG. 5.

The operations in blocks 406 and 408 are performed for each reference receiver configuration (e.g., each pair of CTLE values ($g_{dc}$, $g_{dc2}$)). At block 406, the computing system generates a set of equalized pulse responses, based on the reference receiver configuration and the impulse response of the channel. In one embodiment, the set of equalized pulse responses may include a set of CTLE-equalized pulse responses. For example, each setting of the reference CTLE specified in the standard may iteratively applied to the impulse response to create the set of CTLE-equalized pulse responses.

The operation in block 408 is performed for each of the set of equalized pulse responses (e.g., CTLE-equalized pulse responses). At block 408, the computing system determines a FFE value corresponding to the equalized pulse response. For example, for each of the CTLE-equalized pulses responses, the computing system may further process the respective CTLE-equalized pulse response to calculate the optimal FFE of the length implemented in the DUT, accounting for reference receiver having some input noise and a 4-tap DFE. As noted, the FFE may include a set of FFE coefficients.

At block 410, the computing system ranks the FFE values for the set of equalized pulse responses, according to a predefined metric. For example, the set of optimal FFE values for each of the CTLE-equalized pulse responses may be ranked based on the mean squared error (MSE) obtained for each one.

At block 412, the computing system selects, based on the ranking, a FFE value(s) satisfying a predetermined condition as the Tx FFE. For example, the FFE setting with the MMSE may be selected (or chosen).

Figure 6A:
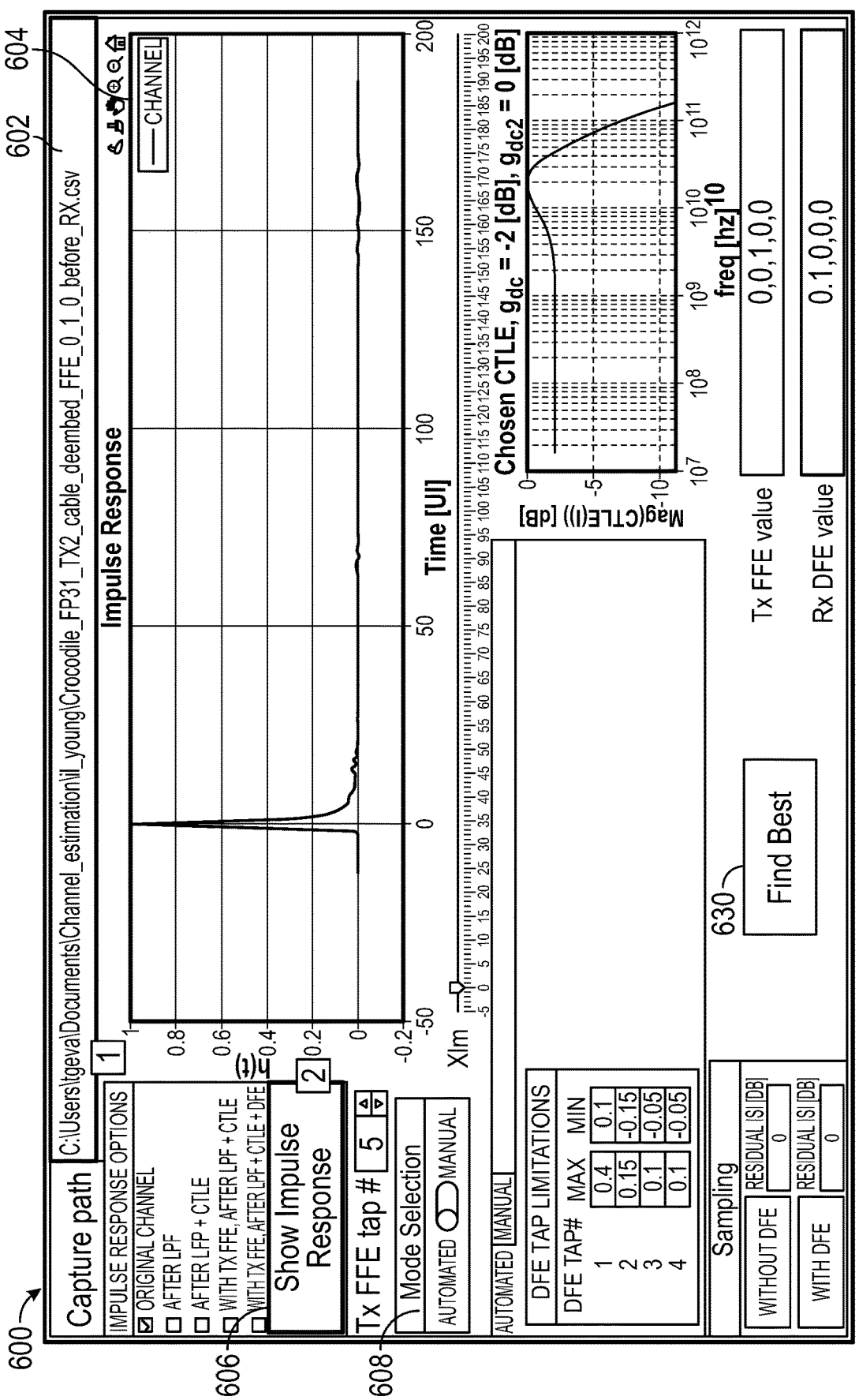
FIGS. 6A-6B illustrates an example user interface, according to one embodiment.
Figure 6B:
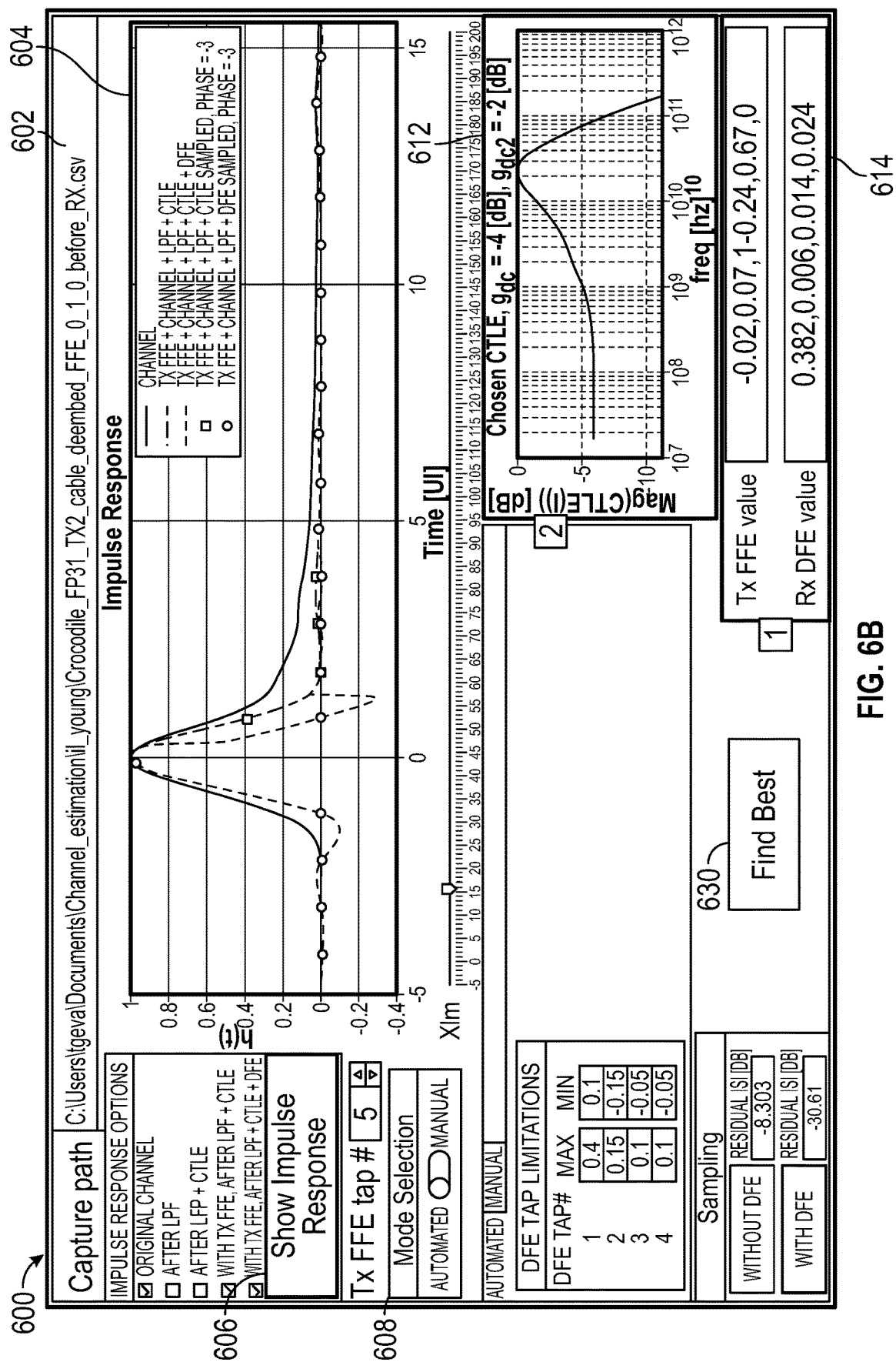
Figure 7:
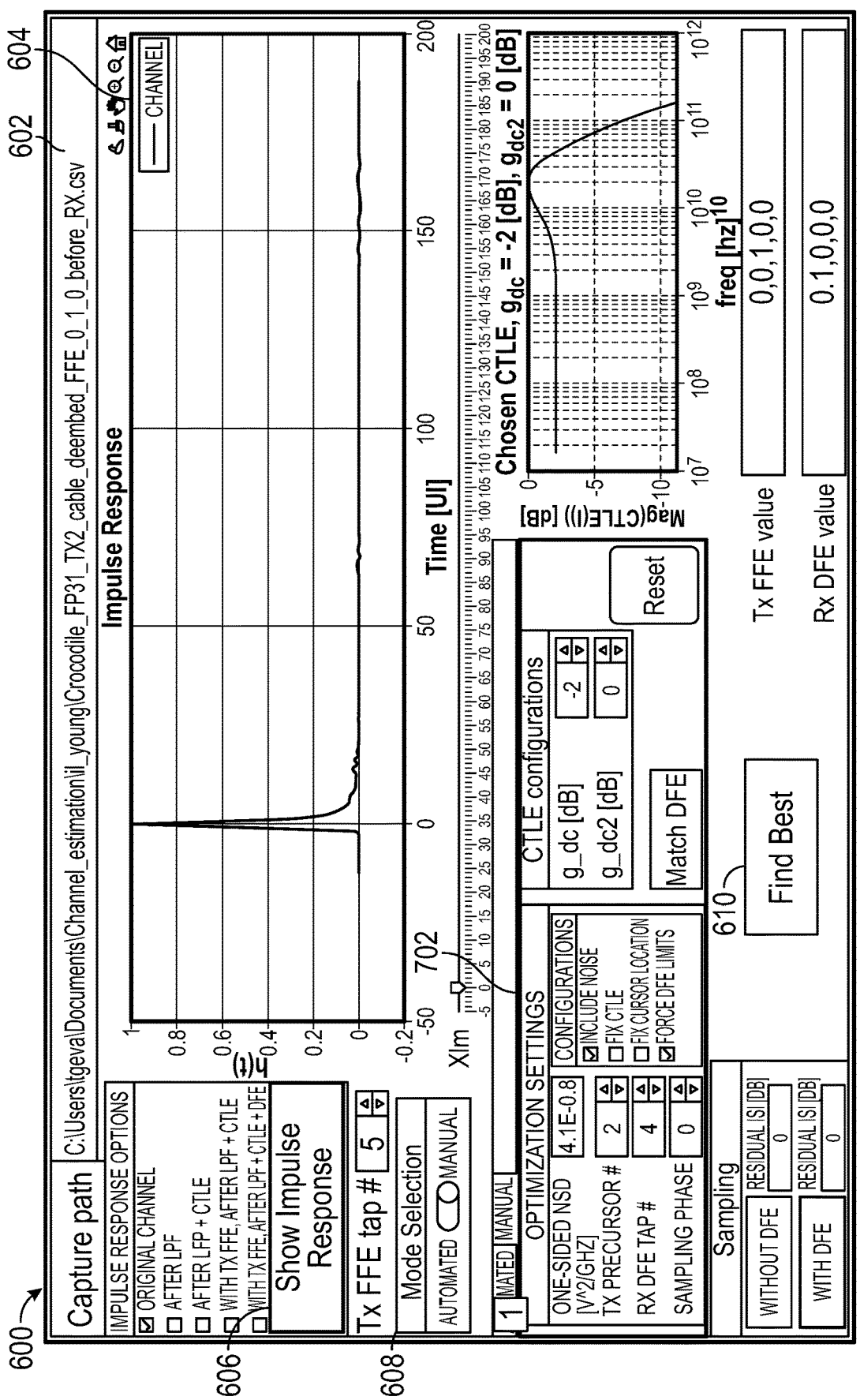
FIG. 7 illustrates another example user interface, according to one embodiment.

Certain embodiments described herein provide simulation tools that allow for optimizing Tx equalization. An example user interface 600 (e.g., graphical user interface (GUI) is illustrated in FIGS. 6A, 6B, and 7. The user interface 600 includes one or more controls that let a user perform Tx equalization to determine an optimal Tx FFE. As shown in FIG. 6A, the user interface 600 includes a field 602 that allows a user to input the path to the single recording of the output signal from the DUT transmitter. The user interface 600 also includes a prompt 606 ("Show Impulse Response" button) that allows the user to view the impulse response of the channel in the panel 604 of the user interface 600.

As noted, the simulation tools described herein can output the Tx FFE to use for the specific channel used for the capture, as well as the suggested reference receiver configuration among the possible configurations specified in a standard (e.g., IEEE standard). In one embodiment, the user interface 600 may provide an automatic mode and a manual mode for performing the Tx equalization. The user interface 600 includes a panel 608 that allows a user to select between the automatic mode and the manual mode.

In the automatic mode, the simulation tool scans through all possible CTLE values ($g_{dc}$, $g_{dc2}$). For each valid ($g_{dc}$, $g_{dc2}$) pair, the following steps are performed: For example, the user interface 600 includes a prompt 630 ("Find Best" button) that finds the optimal Tx FFE across all CTLEs, all possible cursor locations and including both the transmitter noise and the receiver noise.

(1) The simulation tool computes the unconstrained Tx FFE (of the length available in the DUT) and 4-tap DFE, which optimally equalize the channel according to MMSE, for example.

(2) If the resulting unconstrained Tx FFE has a positive c(+1) coefficient, the simulation tool may determine that some of the signal is "wasted" on creating inter-symbol interference (ISI) that the DFE in the receiver will cancel. This, in turn, may reduce the effective eye height and may create higher DFE than the reference receiver allows. In such a case, a second Tx FFE may be calculated, by targeting a partial response: a cursor and a positive postcursor equal to the value of the 1st DFE tap minus the value of c(+1) obtained from the unconstrained Tx FFE calculation. This result generally has c(+1) sufficiently close to 0 and a DFE within the range of the reference receiver.

(3) The simulation tool performs the previous steps for each of the possible phases of the oversampled signal (e.g., with an oversampling rate of 16, there may be 16 different sampling phases), recording the post-DFE MSE and ISI. The simulation tool may record results yielding the lowest MSE (e.g., MMSE) across all phases.

After performing (1)-(3), the simulation tool may select the CTLE that yields the lowest MSE is chosen and its corresponding Tx FFE as the recommended setting. The results, including the Tx FFE, the reference receiver CTLE, the equalized pulse response and their graphic representations, may be presented in the user interface 600. For example, as shown in FIG. 6B, the reference receiver CTLE is shown in panel 612, the Tx FFE is shown in panel 614, and the equalized pulse responses are shown in panel 604.

In some embodiments, if the initially captured signal setting included some initial Tx equalization, the resulting Tx FFE coefficients should be convolved with the initial setting and the result be applied to the Tx FFE. In some embodiments, as noted above, the recommended Tx FFE coefficients may be applied to the DUT, and another measurement may be taken on the scope with the applied reference receiver. The resulting eye parameters may then be checked to verify that they are optimal for the channel.

In the manual mode, the software tool may perform Tx equalization using search space parameters defined by the user. As shown in FIG. 7, for example, the user interface 600 includes a panel 702 with one or more optimization settings fields and one or more CTLE configuration fields. By way of example, the panel 702 includes an "Include Noise" option, a "Fix CTLE" option, a "Fix Cursor Location" option, and a "Force DFE Limits" option. When the "Include Noise" option is selected, the computation may consider both the transmitter noise and the receiver noise. This usually results in CTLE with lower peaking. When the "Fix CTLE" option is selected, the Tx FFE for a particular CTLE is computed. This particular CTLE may be chosen in the CTLE configuration section.

When the "Fix Cursor Location" is selected, the Tx FFE for a particular cursor location is computed and is determined by the "Tx Precursor #" control, where the control states the wanted number of precursors in the equalizer. When the "Force DFE Limits" option is selected, the Tx FFE is computed without the DFE limits constraint.

Figure 8:
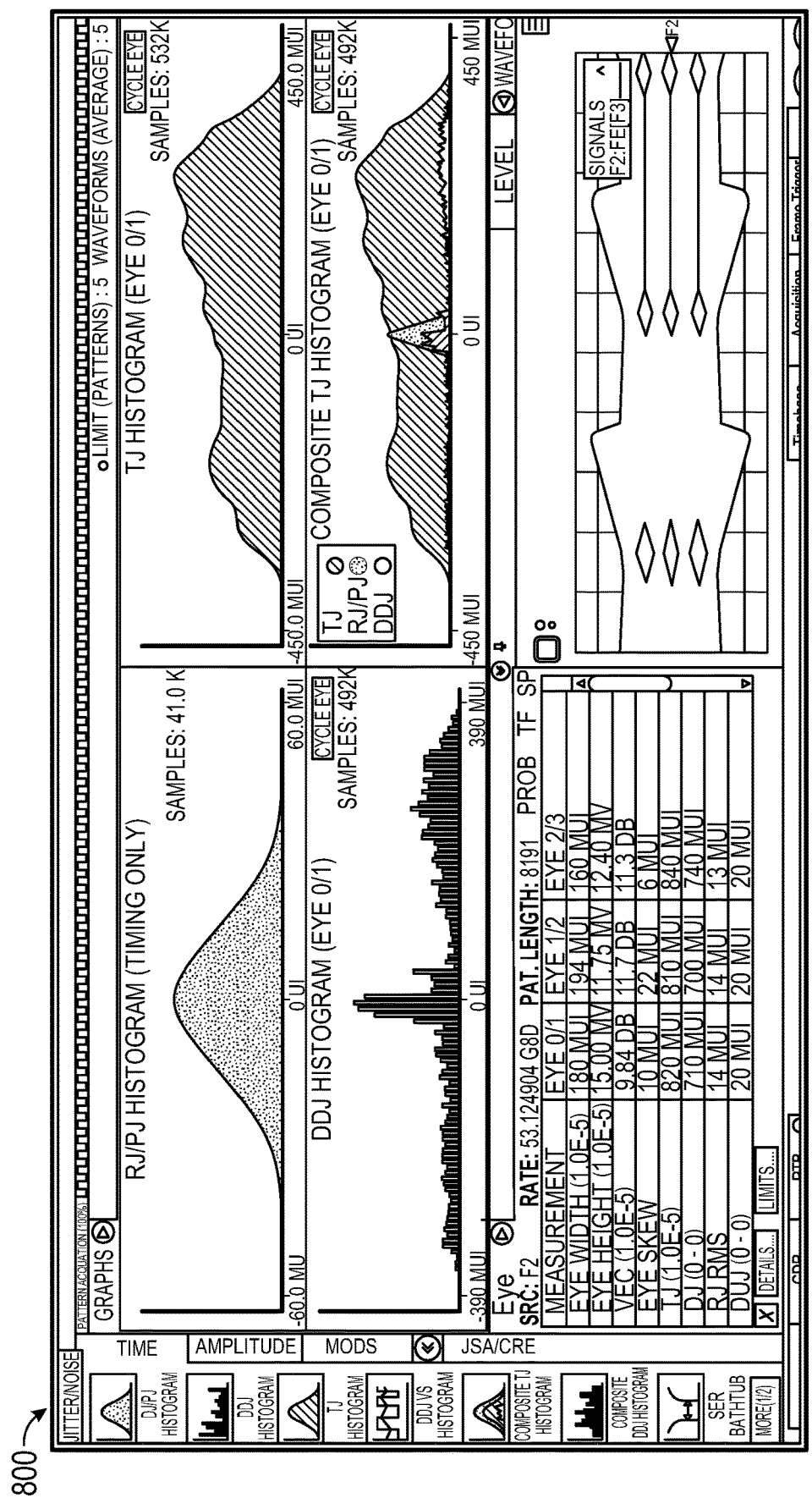
FIG. 8 illustrates an example scope measurement of a host output signal with optimized transmitter equalization, according to one embodiment.

FIG. 8 illustrates a diagram 800 of a scope measurement of a host output signal with optimized Tx equalization, according to one embodiment. In particular, FIG. 8 shows the scope measurement for a port with insertion loss of 10.75 dB in the PCB and 3.47 dB in the package trace (e.g., a total of 14.22 dB). This loss is slightly higher than the recommend host budget in IEEE 802.3ck (e.g., 11 dB PCB and 2.3 dB package, for a total of 13.3 dB).

In certain embodiments, after applying the techniques described herein for optimized Tx equalization, the following Tx FFE coefficients were determined: [−0.02, 0.08, −0.25,0.65,0]. These coefficients were then applied to the DUT Tx FFE. As shown in FIG. 8, the measurement on the scope sows that with the applied reference receiver, the signal meets the target specifications (e.g., EH=11.75 mV and VEC=11.7 dB).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method for performing transmitter equalization for a host device comprising one or more ports, each port comprising at least one channel, the computer-implemented method comprising:
   capturing a single output signal transmitted from the port on the at least one channel;
   determining an impulse response of the channel, based at least in part on the single output signal;
   generating a transmitter feedforward equalization (FFE), based at least in part on the impulse response of the channel;
   determining a reference receiver configuration associated with the transmitter FFE from a plurality of reference receiver configurations specified in a standard; and
   applying the transmitter FFE to the channel of the port of the host device.

2. The computer-implemented method of claim 1, wherein each of the plurality of reference receiver configurations comprises a set of reference continuous time linear equalization (CTLE) values in the standard.

3. The computer-implemented method of claim 1, wherein generating the transmitter FFE comprises:
   for each reference receiver configuration of the plurality of reference receiver configurations, generating a set of equalized pulse responses, based on (i) the reference receiver configuration and (ii) the impulse response of the channel; and
   for each equalized pulse response of the set of equalized pulse responses, determining an FFE value corresponding to the equalized pulse response.

4. The computer-implemented method of claim 3, wherein:
   generating the transmitter FFE further comprises ranking the FFE values for the set of equalized pulse responses according to a predefined metric; and
   selecting, based on the ranking at least one of the FFE values satisfying a predetermined condition as the transmitter FFE.

5. The computer-implemented method of claim 4, further comprising providing an indication of at least one of: (i) the transmitter FFE, (ii) the reference receiver configuration corresponding to the transmitter FFE, or (iii) the equalized pulse responses in a graphical user interface.

6. The computer-implemented method of claim 4, wherein:
   the predefined metric is mean squared error; and
   the at least one of the FFE values that is selected has a minimum mean squared error among the FFE values.

7. The computer-implemented method of claim 1, wherein the transmitter FFE that is generated satisfies a set of target parameters specified in a standard.

8. The computer-implemented method of claim 7, wherein the set of target parameters comprises an eye height and a vertical eye closure.

9. A non-transitory computer-readable medium comprising computer program code that, when executed by one or more processors, performs an operation for optimizing transmitter equalization for a host device comprising one or more ports, each port comprising at least one channel, the operation comprising:
   capturing a single output signal transmitted from the port on the at least one channel;
   determining an impulse response of the channel, based at least in part on the single output signal;
   generating a transmitter feedforward equalization (FFE), based at least in part on the impulse response of the channel;
   determining a reference receiver configuration associated with the transmitter FFE from a plurality of reference receiver configurations specified in a standard; and
   applying the transmitter FFE to the channel of the port of the host device.

10. The non-transitory computer-readable medium of claim 9, wherein each of the plurality of reference receiver configurations comprises a set of reference continuous time linear equalization (CTLE) values in the standard.

11. The non-transitory computer-readable medium of claim 9, wherein generating the transmitter FFE comprises:
   for each reference receiver configuration of the plurality of reference receiver configurations, generating a set of equalized pulse responses, based on (i) the reference receiver configuration and (ii) the impulse response of the channel; and
   for each equalized pulse response of the set of equalized pulse responses, determining an FFE value corresponding to the equalized pulse response.

12. The non-transitory computer-readable medium of claim 11, wherein:
  generating the transmitter FFE further comprises ranking the FFE values for the set of equalized pulse responses according to a predefined metric; and
  selecting, based on the ranking at least one of the FFE values satisfying a predetermined condition as the transmitter FFE.

13. The non-transitory computer-readable medium of claim 12, further comprising providing an indication of at least one of: (i) the transmitter FFE, (ii) the reference receiver configuration corresponding to the transmitter FFE, or (iii) the equalized pulse responses in a graphical user interface.

14. The non-transitory computer-readable medium of claim 12, wherein:
  the predefined metric is mean squared error; and
  the at least one of the FFE values that is selected has a minimum mean squared error among the FFE values.

15. The non-transitory computer-readable medium of claim 9, wherein the transmitter FFE that is generated satisfies a set of target parameters specified in a standard.

16. A computing system comprising:
  one or more memories collectively storing computer-executable instructions; and
  one or more processors coupled to the one or more memories, the one or more processors being collectively configured to execute the computer-executable instructions to cause the computing system to perform an operation for optimizing transmitter equalization, the operation comprising:
  capturing a single output signal transmitted from a port on at least one channel of a host device;
  determining an impulse response of the channel, based at least in part on the single output signal;
  generating a transmitter feedforward equalization (FFE), based at least in part on the impulse response of the channel;
  determining a reference receiver configuration associated with the transmitter FFE from a plurality of reference receiver configurations specified in a standard; and
  applying the transmitter FFE to the channel of the port of the host device.

17. The computing system of claim 16, wherein each of the plurality of reference receiver configurations comprises a set of reference continuous time linear equalization (CTLE) values in the standard.

18. The computing system of claim 16, wherein generating the transmitter FFE comprises:
  for each reference receiver configuration of the plurality of reference receiver configurations, generating a set of equalized pulse responses, based on (i) the reference receiver configuration and (ii) the impulse response of the channel; and
  for each equalized pulse response of the set of equalized pulse responses, determining an FFE value corresponding to the equalized pulse response.

19. The computing system of claim 18, wherein:
  generating the transmitter FFE further comprises ranking the FFE values for the set of equalized pulse responses according to a predefined metric; and
  selecting, based on the ranking at least one of the FFE values satisfying a predetermined condition as the transmitter FFE.

20. The computing system of claim 19, the operation further comprising providing an indication of at least one of: (i) the transmitter FFE, (ii) the reference receiver configuration corresponding to the transmitter FFE, or (iii) the equalized pulse responses in a graphical user interface.

* * * * *